Figure 1:
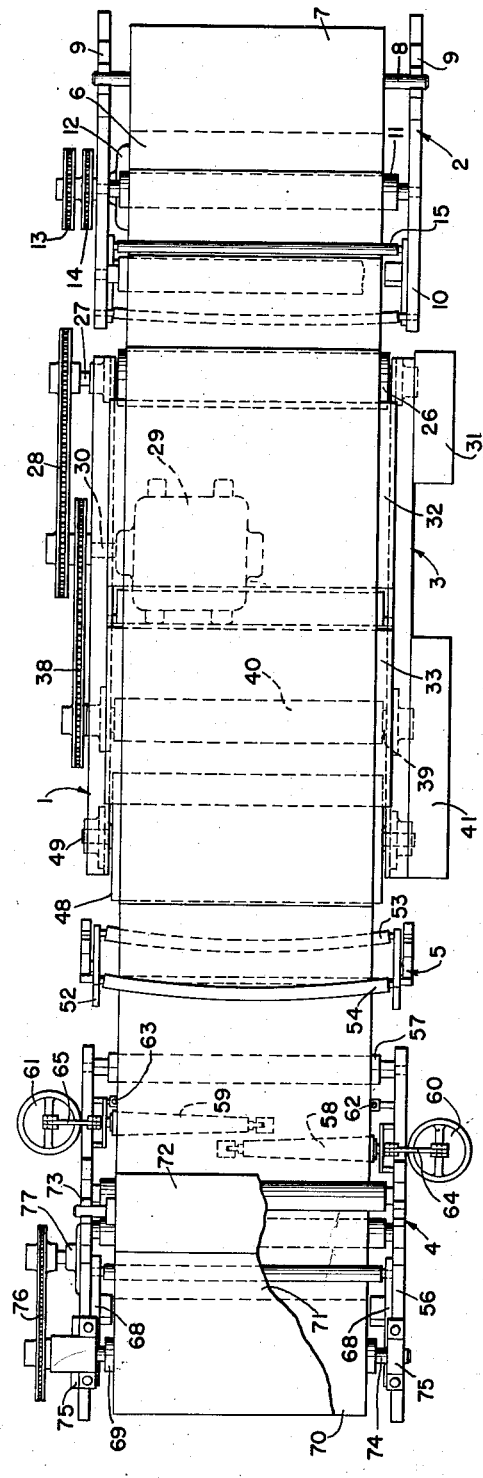

May 25, 1954  J. W. MEHERG ET AL  2,679,088
METHOD OF TREATING THERMOPLASTIC WEB
Filed March 5, 1949  2 Sheets-Sheet 1

INVENTOR.
JESS W. MEHERG
JOE M. RIPPLE
BY R. H. Waters
ATTORNEY

May 25, 1954   J. W. MEHERG ET AL   2,679,088
METHOD OF TREATING THERMOPLASTIC WEB
Filed March 5, 1949   2 Sheets-Sheet 2
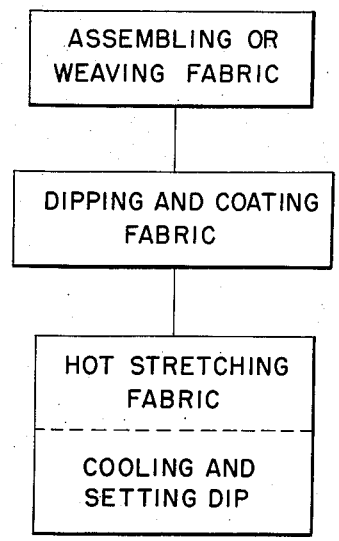
FIG. 3
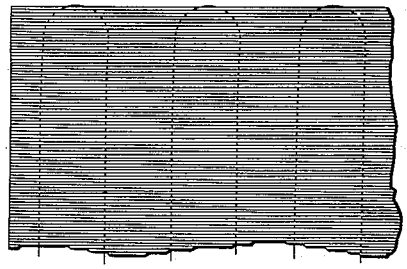
FIG. 4
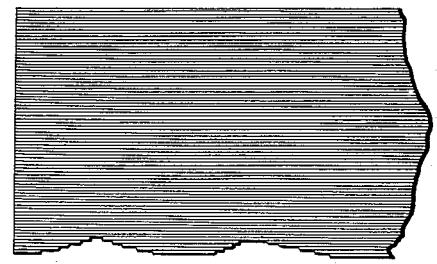
FIG. 5
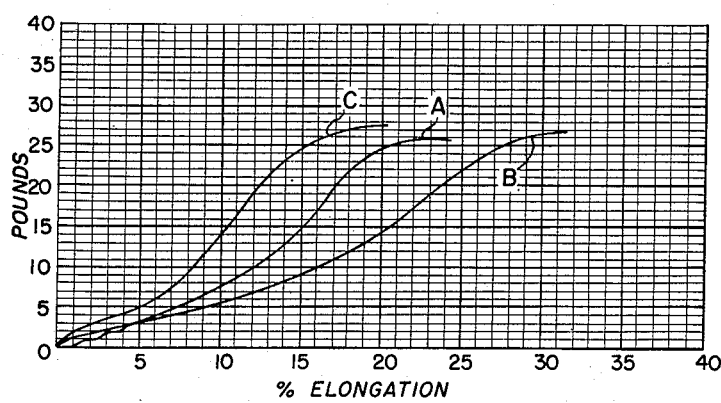
FIG. 6
INVENTOR.
JESS W. MEHERG
JOE M. RIPPLE
BY 
ATTORNEY Patented May 25, 1954

2,679,088

UNITED STATES PATENT OFFICE 2,679,088

METHOD OF TREATING THERMOPLASTIC WEB

Jess W. Meherg, Akron, and Joe M. Ripple, Silver Lake, Ohio, assignors, by mesne assignments, to The Goodyear Tire & Rubber Company, a corporation of Ohio Application May 5, 1949, Serial No. 91,587

3 Claims. (Cl. 28—74)

The present invention relates to a treated web or fabric of nylon or other similar thermoplastic materials and the method of manufacturing the same. More particularly, the invention pertains to a process for preparing and treating webs embodying a plurality of textile threads or cords of nylon and the like in substantially continuous lengths and the product of the process which is advantageously employed in the manufacture of tires and other similar rubber products.

In the manufacture of tires and rubber mechanical goods products, a strong durable reinforcing web or fabric is desired. Such a web or fabric should embody individual textile threads or cords of a type which will effectively resist heat and other deteriorating effects commonly experienced in the normal use of such products. Certain thermoplastic materials such, for example, as nylon in the form of textile threads or cords possess these desirable attributes.

It is well known, however, that nylon, for example, possesses other characteristics which are very difficult to control when incorporated in such products as tires, belts, and the like in that this material has a distinct tendency to stretch or "grow" when in use under varying conditions of load and other related factors. This tendency, which is experienced to a marked degree in most thermoplastic materials such as nylon, is especially undesirable when it occurs in tires. It frequently causes tires to develop flat spots and other similar defects on standing under what are generally considered to be normal load conditions even for a relatively short period of time.

This growth effect is at least partially attributed to the fact that the tire fabric comprising a plurality of such individual threads or cords is subjected, in the course of its preparation, to a dip embodying rubber, either natural or synthetic, and an adhesive or bonding agent, the purpose of which is to insure the required cohesion between the rubber plies and the individual cords of the web or fabric from which the product is constructed. The raw web or fabric possesses certain well defined elongation characteristics which are materially altered by the dipping operation. The individual threads or cords of the web or fabric, after being subjected to the dip, exhibit a much greater elongation tendency than the raw or untreated threads or cords under the same load conditions.

This capacity of the individual threads or cords to elongate and its effect upon the web or fabric comprising them must be materially reduced in order to enable such materials to be employed advantageously in the manufacture of pneumatic tires and other high quality rubber products. Such products are deleteriously affected by these excessive elongation characteristics. It has already been found that stretching the individual threads or cords, or the webs or fabrics formed therefrom, prior to the dipping operation does not insure a permanent removal of this tendency to elongate since the pre-stretched threads on being subjected to the dip after stretching are caused to reassume substantially their original elongation characteristics in addition to requiring certain additional indefinite increments induced by the action of the dip.

It should be distinctly understood that there is no desire to remove from the individual textile threads or cords, or the web or fabric comprising them, all of the tendency of the material to elongate under normal load conditions. It is well established that the webs or fabrics from which pneumatic tires are fabricated must possess some degree of elongation within certain well-defined limits in order that the tires themselves will afford the desired cushioning effect. The purpose of the method herein defined is thus to produce a treated web or fabric in which the elongation characteristics of the material of which the web or fabric is composed are limited or carefully controlled within certain predetermined limits.

It is, therefore, one of the principal objects of the process of the present invention to produce a web or fabric of nylon cords and the like in which the individual textile threads and cords of which it is composed are so treated that they will permanently resist this tendency to elongate unduly under load.

It is a further object of the present invention to provide a web or fabric which has been prepared or treated to enable it to be incorporated in various rubber products such as tires and the like which possesses predetermined controlled elongation characteristics so as to prevent growth in the normal use of the resulting products in which the web or fabric is used.

Other important objects of the invention will become apparent as the description of a specific form of apparatus and its use in the furtherance of the process of the present invention proceeds.

Figure 2:
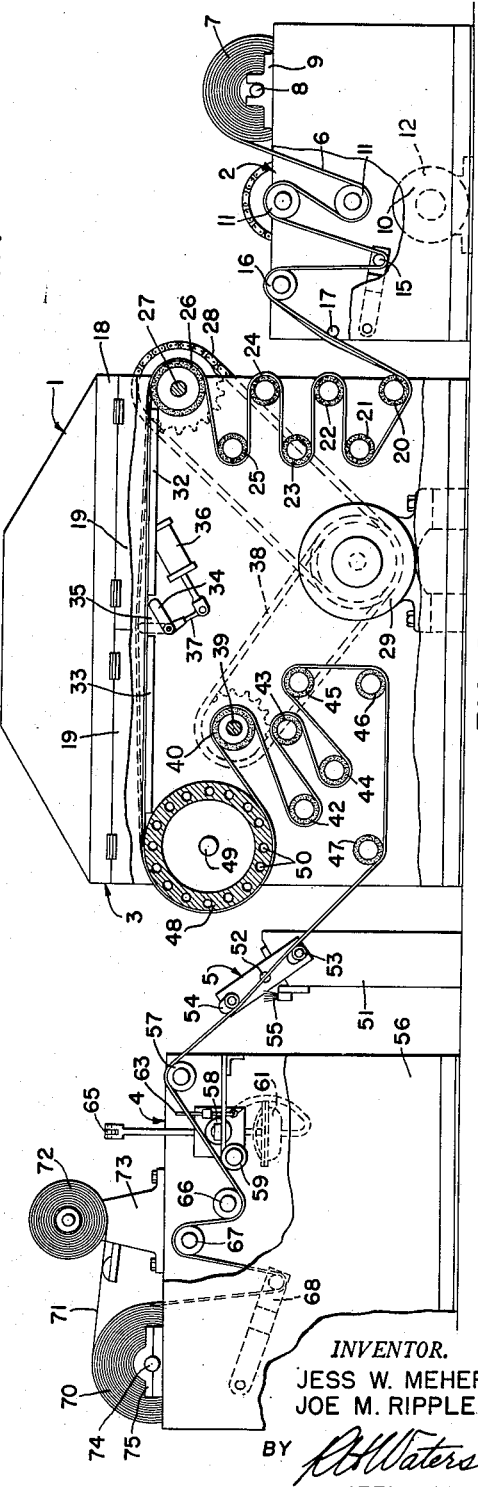

In the drawings, Fig. 1 is a plan view with parts broken away of a typical form of apparatus for practicing the method of the present invention. Fig. 2 is a side elevation with parts in section and broken away showing in greater detail the apparatus of Fig. 1. Fig. 3 is a chart illustrating the preferred steps in the process under which the machine of Figs. 1 and 2 operates. Fig. 4 represents a portion of a web or fabric embodying a plurality of longitudinally extending textile threads or cords held in parallel alignment by spaced tie threads or cords. Fig. 5 is a portion of web or fabric similar to that of Fig. 4 but without tie threads or cords. Fig. 6 is a graphic illustration of the comparative elongation characteristics of raw dipped and hot stretched fabric.

It will be noted from Fig. 3 of the drawings that the process of the present invention involves a plurality of steps only a portion of which is advantageously accomplished on a web stretching apparatus to be described in detail hereinafter. Certain of the other steps involved in the manufacture of a web or fabric suitable for use in the manufacture of tires and other rubber products may advantageously be accomplished upon various forms of conventional apparatus (not shown). It will be noted that the first step in the operation involves the formation or weaving of a web of fabric.

Such a web as that to be treated in the web stretching apparatus may embody a plurality of spaced parallel textile threads or cords of substantially continuous length without any form of transverse threads whatsoever being employed to maintain the parallelism of the cords (see Fig. 5). It is, however, to be understood that the presence of woof or tie threads such as may be introduced on conventional weaving apparatus does not in any way alter the effectiveness of the process. Where such woof or tie threads are employed in the makeup of a web, such threads are relatively widely spaced as compared to the warp in the longitudinal dimension of the fabric as will be noted from Fig. 4 of the drawings. After the fabric or web has been assembled, as indicated by the second step in Fig. 3, it is passed through a conventional coating or dipping apparatus (not shown). In this operation the individual threads or cords of the web are subjected to the application of suitable bonding agents or adhesives together with rubber, either natural or synthetic, to enhance the adhesion of the threads or cords for rubber and to insure a positive bond therewith. To this end, the fabric is introduced in a form of web to a bath embodying the required adhesives either by actual immersion or by contact with a scotch roll. These adhesive preparations ordinarily tend to set up or harden when they are subjected to heat.

As previously indicated, the wetting and partial drying of the web in this stage of the operations induces certain highly undesirable elongation characteristics therein which tend to increase materially the existing elongation characteristics of the undipped web itself. In order to provide some measure of control or appreciable reduction in these elongation characteristics of the fabric or web, it is necessary to subject the material after the dipping operation to the action of heat and stretching. The heat tends to soften the thermoplastic material of which the individual threads or cords are composed and greatly facilitates the stretching of the cords without injury.

The third step of the process contemplates subjecting the fabric to heat and stretching concomitantly with the drying and setting of the heat hardenable material of which the dip applied to the fabric is composed. The web stretching apparatus 1 shown in Figs. 1 and 2 accomplishes this purpose by applying heat to the traveling web of fabric at a temperature which approximates the temperature of the melting point of the individual cords. Such a temperature is maintained only for a time interval less than that required actually to melt the cord.

It has been found that successful treatment of a traveling web by the web stretching apparatus 1 may be accomplished by employing temperatures ranging from 300 to 530 degrees F., depending upon the character of the thermoplastic material being employed in the fabric itself. The time interval is also dependent upon the character of the material, but it has been found in the case of most of the thermoplastic materials which are capable of being employed in tire fabric and the like to require an exposure of from 5 to 72 seconds. Moreover, various ranges of stretch may be applied to the cord varying from a minimum of approximately 8 per cent to a maximum of approximately 25 per cent. In the case of nylon, the optimum conditions for best results have been found to involve the application of heat at a temperature of approximately 440 degrees F. for a time interval of 18 seconds together with an ultimate stretch of about 13 per cent.

Immediately after the web is subjected to heat and tension within the ranges previously indicated, it is desirable, although not essential, to subject the web to a cooling operation while the stretch is maintained therein. This cooling step insures that the thermoplastic material will be hardened and that the dip or heat hardenable material applied to the surface thereof will maintain the stretch introduced in the fabric by the web stretching apparatus 1. The finished web of fabric now possesses the desired attributes for its use in the manufacture of tires and other similar rubber products which require the presence of some elongation within certain maximum limits.

The finished web of fabric is thus capable of competing favorably with such conventional materials as cotton and rayon by acquiring in the manner described certain predetermined elongation characteristics within well established predetermined values and free from such excessive elongations as result in growth of the tire carcass. By way of illustration, attention is directed to Fig. 6 in which the elongation characteristic of a series of samples of nylon cord fabric are plotted in the form of the mean curves A, B, and C.

Curve A represents the mean for the several samples and shows the percentage elongation of the raw samples under an increasing tension measured in pounds pull. It is to be noted that under a 10 pound pull, the raw or wholly untreated samples showed an average percentage increase of approximately 12.08 per cent. Curve B is the mean for samples of the same raw fabric previously tested upon being removed from the dipping and coating step in the process. Here the samples subjected to a 10 pound pull exhibit an average percentage elongation of 16.2 per cent. The properties of the final product are demonstrated by the curve C which clearly indicates that under a 10 pound pull the average percentage elongation of the samples was 8.2 per cent.

This carefully controlled margin of elongation of a nylon cord fabric is highly advantageous for the successful use of the fabric in the manufacture of pneumatic tires and other similar products. Fabrics having a resultant elongation in the range of 6 to 9 per cent of the original longitudinal dimension of the fabric have been found to possess optimum characteristics for use in tires.

Referring now to Fig. 1 of the drawings, the reference numeral 1 identifies the web stretching apparatus generally. The web stretching apparatus 1 embodies a tension let-off means 2, a heating and stretching means 3, and a wind-up means 4. Disposed between the heating and stretching means 3 and wind-up means 4 is a guiding and spreading device 5 which serves to direct the fabric or web 6 from the one portion of the apparatus to the other in a uniform width and free from wrinkles in its lateral dimension.

The fabric or web 6, for the purpose of the present description, comprises a plurality of textile threads or cords of nylon of uniform gauge. The web 6 will have been already subjected to a heat hardenable dip embodying an adhesive of a type and in the manner previously described which will facilitate its being incorporated in natural or synthetic rubber with a satisfactory bond being established between the rubber and the individual threads comprising the web.

The web 6 in the form of a supply roll 7 is mounted upon a shaft 8 which is freely rotatably supported in bearings 9 mounted on the frame 10 of the tension let-off means 2. The web 6 is directed around a pair of horizontal rolls 11 disposed in vertically spaced parallel relation and rotatably supported by the frame 10 of the tension let-off means 2. One of the rolls 11, preferably the uppermost, is driven at a predetermined speed by means of a motor 12 mounted in the tension let-off means 2 through the chain and sprocket drive 13. A similar chain and sprocket drive 14 serves to drive the bottom roll 11 at a predetermined uniform speed with respect to its uppermost counterpart.

The web 6, after leaving the uppermost roll 11 of the tension let-off means 2, passes under a weighted roll 15 which serves to maintain a partial festoon of material preparatory to its passing over the freely rotatably mounted roll 16 which is also supported in the frame 10 of the tension let-off means 2. A suitably curved roll 17 is arranged on the frame 10 of the tension let-off means 2 so as to provide a constant contact with the traveling web 6 and is so positioned that it tends to spread the material in its lateral dimension to the fullest extent of its width.

The heating and stretching means 3 of the web stretching apparatus 1 is advantageously provided with a complete frame and housing structure 18 in which a plurality of hingedly mounted closures or flaps 19 are employed to permit access to the web 6 and the working parts of the apparatus, but at the same time to afford a shield to prevent undue heat losses. The web 6 passes from the tension let-off means 2 to the lowermost one of a series of rubber covered tension rolls 20 to 25, inclusive, mounted in the frame 18 of the heating and stretching means 3 in vertically staggered relation. From the last roll 25 the web 6 next passes around a somewhat larger rubber covered roll 26 mounted upon the shaft 27 disposed transversely of the heating and stretching means 3.

The roll 26 is positively driven by a chain and sprocket drive connected to a motor 29 which actuates the drive shaft 30 on which one of the sprockets is mounted. The drive for the series of rubber covered rolls 20 to 25, inclusive, is accomplished by means of a conventional drive unit (not shown) enclosed in the housing 31 on the heating and stretching means 3 as will be seen in Fig. 1.

The web 6 is directed longitudinally of the heating and stretching means 3 and in contact with a pair of spaced platens 32 and 33 extending transversely of the apparatus and the direction of travel of the web. A laterally disposed bar member 34 extends beneath the web 6 in the space 35 between the two platens 32 and 33. The purpose of the bar member 34 is to provide a safety feature to prevent burning of the web 6 in the event that the operation of the heating and stretching means 3 should be halted temporarily with the web 6 in contact with the heated platens 32 and 33. The bar member 35 is actuated by an air cylinder 36 and suitable linkage 37 to shift the same to a vertical position indicated by the dotted lines in Fig. 2. This action raises the web 6 out of contact with the surface of the heated platens 32 and 33, thereby preventing burning or scorching of the material.

The motor 29 of the heating and stretching means 3 through the shaft 30 serves to actuate a chain and sprocket drive 38 which rotates the transverse shaft 39. The shaft 39 carries a roll 40, the surface of which is advantageously rubber covered. Through a conventional drive unit (not shown) disposed within the housing 41 (Fig. 1) a series of rubber covered rolls 42 to 46, inclusive, is actuated from the driven shaft 39. The train of driven rolls 40 and 42 to 46, inclusive, serves to induce a predetermined amount of stretch in the web 6 after it leaves the rubber covered roll 26 and during its passage across the heated platens 32 and 33.

A similar rubber covered roll 47 is freely rotatably mounted in the heating and stretching means 3 to direct the web 6 to the guiding and spreading device 5. After leaving the platen 33 and before it comes in contact with the rubber covered roll 40, the web 6 passes around a cooling roll 48 mounted upon a shaft 49 in freely rotatably mounted relation.

The cooling roll 48 may be maintained at any predetermined temperature by means of a series of bores or coils 50 disposed in the body of the roll and adapted to direct the circulation of a suitable refrigerant or cooling medium therethrough.

After leaving the rubber covered roll 47, the web 6 passes to the guiding and spreading device 5 embodying a pedestal or base 51 on which is mounted a frame 52 in adjustably tiltable relation with respect to the pedestal. The frame 52 supports a pair of curved rolls 53 and 54 over and under which the web 6 is passed in its path of travel between the heating and stretching means 3 and wind-up means 4. A suitable static eliminator device 55 which may take the form of a laterally extending brush is disposed in close proximity to the traveling web 6 as it passes between the curved rolls 53 and 54. The static eliminator 55 serves to reduce the danger of static charges built up in the course of the treatment of the fabric or web 6 as it passes through the web stretching apparatus 1.

The wind-up means 4 embodies a frame 56 which supports a transversely disposed roll 57 over which the web 6 passes as it enters. A pair of frusto-conically shaped rolls 58 and 59 disposed beneath the web 6 in the manner indicated in Fig. 1 serve to maintain the proper edge-to-edge relationship of the fabric 6 with respect to the wind-up package on the wind-up means 4. The rolls 58 and 59 are actuated by a pair of balance pressure diaphragm valves 60 and 61, respectively.

A feeler member 62 adjacent one of the lateral edges of the web 6 serves to control the supply of air to the diaphragm valve 60 if the web should shift sideways so as to contact the feeler member. A similar feeler 63 adjacent the opposite edge of the web 6 acts to control the operation of the diaphragm valve 61. The linkages 64 and 65 transmit the action of the diaphragm valves 60 and 61, respectively, to the rolls 58 and 59 depending upon which of the feelers 62 or 63 is moved by the lateral shifting of the web 6. This mechanism serves to raise or lower the outermost ends of the respective rolls 58 and 59 about the pivotal mountings at their opposite ends to cause the web to move laterally and to maintain it in strict alignment throughout the wind-up means 4.

The web 6 next passes around the rolls 66 and 67 and the weighted roll 68 to the beam 69 on which the web package 70 is wound. The layers of the web 6 are separated in the course of their being wound into the web package 70 as by means of a liner 71. The liner 71 is continuously withdrawn from a supply package 72 of liner material freely rotatably mounted on the pair of spaced bearing supports 73 on the frame 56 of the wind-up means 4.

The beam shaft 74 supporting the beam 69 is rotatably mounted in the spaced bearing supports 75 on the frame 56 on the wind-up means 4 and is driven as by means of a chain and sprocket drive 76. The chain and sprocket drive 76 is connected to the shaft of a motor 77 and insures a positive wind-up of the web 6 in the form of the web package 70. The web package 70 is capable of removal from the machine when it reaches a predetermined size to enable it to be handled and prepared for use in the manufacture of fabric tire carcasses or as the reinforcing material in other similar rubber products.

By the terms "potential elongation" and "potential elongation factor" wherever used herein is meant that tendency of the web or fabric to stretch upon the application of tension. It is highly desirable that the tendency of the web or fabric to stretch unduly be reduced to a minimum and be carefully controlled to enable its highly desirable attributes to be employed to advantage in tires and other vulcanized rubber products. The quality and usefulness of such products are quickly affected by an excessive potential elongation.

It will be understood that in general for each reduction in temperature a correspondingly longer time interval is required to complete the processing of the web or fabric. In production a temperature of 390 degrees F. has been employed satisfactorily with a corresponding time interval of 48 seconds exposure of the web. It has been found that satisfactory results may be obtained with temperatures ranging from 410 to 440 degrees F. with time exposures of from 36 to 24 seconds, the time being selected in inverse relation to the temperature applied.

It is desirable also to note that the peculiarities of the thermoplastic material may require the application of greater tension in the web during the stretching operation than will be reflected in the ultimate elongation of the material. For example, it has been found that in practice a stretch of 20 per cent was required to insure an ultimate elongation of the web of approximately 13 per cent. The web necessarily contains some residual capacity to shrink back after the tension is removed from the web and the temperatures applied are reduced to ordinary room temperatures.

While certain representative embodiments and details have been shown for the purpose of illustrating the invention, it will be apparent to those skilled in this art that various changes and modifications may be made therein without departing from the spirit or scope of the invention.

We claim:

1. In the manufacture of a fabric web of nylon for use in reinforced rubber products comprising assembling a plurality of nylon cords of substantially continuous lengths and characterized by an initial potential elongation factor in the form of a web by arranging the cords longitudinally in closely spaced mutually parallel relation, maintaining said cords in position while applying to the web an aqueous solution of a heat hardenable cord to rubber bonding agent, subjecting the web to heat to partially dry the web and set the bonding agent without stretching, which introduces a potential elongation in the individual cords in excess of the initial potential elongation thereof, subsequently removing from the web so fabricated and treated substantially all of the potential elongation introduced by the application of bonding agent and drying thereof by subjecting the web to heat at a temperature approximating that of the melting point of the individual cords for an interval of time less than that required to melt the cords; and concomitantly stretching the cords 8% to 25%, whereby substantially all of the potential elongation induced in the several cords by the coating thereof is removed therefrom.

2. The process according to claim 1 in which the steps of heating and stretching of the web are followed by a cooling step to harden the individual cords while the web is retained in stretched condition.

3. The process according to claim 1 in which the temperatures to which the web is subjected in the stretching step are within the range of from 300 to 530 degrees Fahrenheit for a time interval ranging from 5 to 72 seconds in inverse relation to the temperature range.

References Cited in the file of this patent

UNITED STATES PATENTS

| Number | Name | Date |
|---|---|---|
| 2,238,694 | Graves | Apr. 15, 1941 |
| 2,252,554 | Carothers | Aug. 12, 1941 |
| 2,307,846 | Miles | Jan. 12, 1943 |
| 2,381,398 | Bosomworth | Aug. 7, 1945 |
| 2,419,922 | Tippetts | Apr. 29, 1947 |
| 2,444,903 | Van Buren | July 6, 1948 |
| 2,477,156 | Waltz | July 26, 1949 |
| 2,496,911 | Green | Feb. 7, 1950 |
| 2,514,694 | Bosomworth | July 4, 1950 |

FOREIGN PATENTS

| Number | Country | Date |
|---|---|---|
| 470,331 | Great Britain | Aug. 3, 1937 |

OTHER REFERENCES

"Silk Journal and Rayon World," April 1947, page 32.